United States Patent
Feng et al.

(10) Patent No.: US 12,192,649 B2
(45) Date of Patent: Jan. 7, 2025

(54) INFRARED-BASED PROCESSING OF AN IMAGE

(71) Applicant: QUALCOMM Incorporated, San Diego, CA (US)

(72) Inventors: Wen-Chun Feng, New Taipei (TW); Wei-Chih Liu, Taipei (TW); Yi-Chun Hsu, Taipei (TW); Tai-Hsiang Jen, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 17/334,182

(22) Filed: May 28, 2021

(65) Prior Publication Data
US 2022/0385873 A1 Dec. 1, 2022

(51) Int. Cl.
*H04N 23/88* (2023.01)
*G01J 5/60* (2006.01)
*G01S 17/89* (2020.01)
*H04N 23/71* (2023.01)
*G01J 5/00* (2022.01)

(52) U.S. Cl.
CPC ............... *H04N 23/88* (2023.01); *G01J 5/60* (2013.01); *G01S 17/89* (2013.01); *H04N 23/71* (2023.01); *G01J 2005/0077* (2013.01)

(58) Field of Classification Search
CPC . H04N 23/88; H04N 23/71; G01J 5/60; G01J 2005/0077; G01S 17/89
See application file for complete search history.

(56) References Cited

U.S. PATENT DOCUMENTS

| | | | |
|---|---|---|---|
| 2019/0052855 A1* | 2/2019 | Nair | G02B 5/208 |
| 2021/0044785 A1* | 2/2021 | Hsiao | H04N 25/135 |
| 2021/0105392 A1* | 4/2021 | Segapelli | G03B 15/05 |
| 2022/0103795 A1 | 3/2022 | Lee et al. | |

FOREIGN PATENT DOCUMENTS

| | | | |
|---|---|---|---|
| EP | 3125526 A1 | 2/2017 | |
| WO | WO-2017066263 A1 | 4/2017 | |

OTHER PUBLICATIONS

International Search Report and Written Opinion—PCT/US2022/072481—ISA/EPO—Aug. 26, 2022.

* cited by examiner

*Primary Examiner* — Twyler L Haskins
*Assistant Examiner* — Fayez A Bhuiyan
(74) *Attorney, Agent, or Firm* — QUALCOMM Incorporated

(57) ABSTRACT

A multi-point measurement of a scene captured in an image frame may be used to process the image frame, such as by applying white balance corrections to the image frame. In some examples, the image frame may be segmented into portions that are illuminated by different illumination sources. Different portions of the image frame may be white balanced differently based on the color temperature of the illumination source for the corresponding portion. Infrared measurements of multiple points in the scene may be used to determine a characteristic of the illumination source of different portions of the scene. For example, a picture that includes indoor and outdoor portions may be illuminated by at least two illumination sources that produce different infrared measurements values. White balancing may be applied differently to these two portions to correct for color temperature of the different sources.

29 Claims, 7 Drawing Sheets

300

| 9 | 16 | 27 | 39 | 43 | 44 | 26 | 19 |
|---|---|---|---|---|---|---|---|
| 12 | 10 | 22 | 97 | 125 | 83 | 38 | 31 |
| 8 | 11 | 23 | 122 | 176 | 130 | 37 | 25 |
| 10 | 18 | 19 | 48 | 148 | 136 | 45 | 13 |
| 14 | 14 | 23 | 50 | 160 | 182 | 45 | 14 |
| 10 | 17 | 17 | 27 | 65 | 66 | 40 | 9 |
| 13 | 11 | 17 | 27 | 28 | 20 | 12 | 23 |
| 17 | 12 | 14 | 31 | 50 | 34 | 19 | 20 |

INFRARED-BASED PROCESSING OF AN IMAGE

FIELD OF THE DISCLOSURE

Aspects of the present disclosure relate generally to image processing. Some features of the disclosure may enable and provide improvements in the processing of images.

BACKGROUND

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

An image capture device captures a scene in the presence of light, and the light that illuminates the scene is referred to as an illumination source. Illumination sources are usually not pure white, but instead have a bias towards a particular color. The color bias is usually measured in terms of a color temperature. Human eyes can compensate for illumination that is not pure white, so colors appear relatively consistent over a wide range of lighting conditions. For example, human eyes adjust to different lighting conditions so that gray objects appear gray.

Electronic sensors, such as used in image capture devices, may perceive the same scene differently when the illumination source changes. Electronic sensors capture images but may be unable to compensate for different lighting conditions having different color temperatures. An image sensor used in an image capture device may capture an image that exhibits a color shift attributable to illumination from a non-pure white source. The color shift exhibited in the captured image may appear unnatural to the human eye and create a perception that the sensor or capture device is of low quality and unable to accurately capture real world images.

BRIEF SUMMARY OF SOME EXAMPLES

An image frame captured from the image sensor may be processed to compensate for lighting conditions and color temperature of the illumination source. White balancing of the image depends on the color temperature of the illumination source. White balancing configured for an illumination source at a first color temperature may not correct for a second color temperature of a second illumination source and may further decrease the perceived image quality when viewed by a human by introducing additional color shift into the image.

The white balancing applied to an image frame captured by an image sensor can result in further decreased image quality when there are multiple illumination sources for the scene being captured. Infrared measurements of a scene corresponding to the captured image frame may be used to process the image frame, such as to correct white balance in the image by taking into account the different illumination sources. The processing using the infrared measurements may enhance the image frame by processing the image frame using the infrared measurements to correct white balance based on different light sources within the scene. Alternatively or additionally, other data corresponding to the image frame, such as feature maps generated by computer vision processing and/or other metadata, may be used to process the image frame, such as to correct white balance.

Without the infrared or other data used to process the image frame, each illumination source in the scene may have a different color temperature and white balancing corrections operate on image frame statistics do not take into account the different illumination source colors. White balancing of a scene with mixed illumination sources may result in adjusting the entire image in a manner that skews the color temperature of the illumination sources that may result in an even more unnatural appearance to the human eye, and these shortcomings may be addressed by processing the image using data described according to embodiments of this disclosure.

A multi-point measurement of the scene corresponding to the captured image frame may be used to determine portions of the image frame that are illuminated by different illumination sources. In some embodiments, different portions of the image frame may be white balanced differently based on the color temperature of the illumination source for the corresponding portion. The infrared measurements of multiple points in the scene may be used to determine a characteristic of the illumination source of different portions of the scene. For example, a picture that includes indoor and outdoor portions may be illuminated by at least two illumination sources. Outdoor portions of a scene are illuminated during daylight by a natural illumination source (e.g., the sun), and the indoor portions of a scene are illuminated by artificial illumination sources (e.g., incandescent bulb, fluorescent bulb, LED bulb, etc.). Portions of the scene illuminated by the sun may have higher infrared measurements than other portions of the scene illuminated by artificial illumination sources. Multi-point infrared measurements may thus be used to distinguish a first portion of a scene that is illuminated by the sun and a second portion of a scene that is illuminated by an indoor light. White balancing may be applied differently to these two portions to correct for color temperature of the different sources, which results in an image with improved color accuracy and a more natural appearance to the human eye. Without treating the different portions differently during white balancing, the image frame may include an unnatural color cast that dulls colors, such as by making blue colors appear too yellow.

The multi-point infrared measurement of the scene may be a lower resolution than the image frame. For example, the image frame may have a resolution of 1920 values by 1080 values (in which the values may correspond to pixels), whereas the multi-point infrared measurement may have a resolution of 8 values×8 values. The lower resolution of the multi-point infrared measurement may reduce the cost and complexity of the device capturing the infrared measurements without significantly reducing the ability to determine white balancing correction. A scene generally includes only one, two, or a few different illumination sources, such that a high resolution of infrared measurements is not required to determine the different illumination sources present in a scene.

Computer vision may be used in determining different portions of the image frame illuminated by different illumination sources. Computer vision analysis may identify features in the scene. The computer vision analysis may identify features, such as window frames, door frames, trees, or animals, that are found outdoors, in a portion of the image frame and determine a first portion of the image frame based on those features. The multi-point infrared measurements may be used with the computer vision analysis to refine the determination of different portions of the image frame. For example, a few multi-point infrared measurements may be used to coarsely define an outdoor portion in the image frame, and computer vision analysis used to determine features that define a boundary around the outdoor portion. In a scene including an indoor room with a window to the outside, the multi-point infrared measurement may coarsely identify that a portion of the image inside the window frame is illuminated by the sun and computer vision analysis used to identify a window frame bordering the outdoor portion of the scene. A first white balancing may be applied to the outdoor portion of the scene inside the window frame to correct for the color temperature of the sun and a second white balancing may be applied to the indoor portion of the scene around the window frame to correct for the color temperature of the artificial lighting.

The determination of different portions may also or alternatively be based on metadata regarding the image frame. For example, the time of day and/or the date of the capture of the image frame may indicate whether outdoor regions of the scene are illuminated by the direct overhead sunlight, evening sunlight, or moonlight. As another example, the location of the capture of the image frame may indicate whether the image scene is an outdoor scene, such as when the location corresponds to a location whether there is no building, or may indicate a mixed-illumination-source scene, such as when the location corresponds to a building location. Further examples of metadata include data received from smart home assistants and/or wireless connections to other devices. A smart device, such as a light bulb or television, nearby the image capture device when the image frame is generated may indicate whether a nearby artificial illumination source is turned on or off, and that metadata for the image frame may be used to determine the white balancing for one or more portions determined in the image frame and/or determine a number of different portions that exist in the image frame. In some embodiments, each light bulb that is on may be used to indicate the existence of another portion of the image that is illuminated by an artificial light source.

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In general, this disclosure describes image processing techniques involving digital cameras having image sensors and circuitry for processing data received from the image sensor, such as image signal processors (ISPs), general-purpose single- or multi-core processors, digital signal processors (DSPs), application-specific integrated circuits (ASICs), field programmable gate arrays (FPGAs) or other programmable or fixed logic devices. The image signal processor may be configured to control the capture of image frames from one or more image sensors and process the image frames from one or more image sensors to generate a view of a scene in a corrected image frame, in which white balancing may be applied to adjust colors in image frames captured from one or more image sensors as part of a process to produce the corrected image frame. In an example, the image signal processor may receive an instruction to capture a sequence of image frames in response to the loading of software, such as a camera application, on the CPU. The image signal processor may be configured to produce a single flow of output frames, based on respective corrected images from the image sensors. The single flow of output frames may include corrected image frames that contain image data from an image sensor that have been corrected, such as by white balancing.

The corrected image frame may be produced by combining aspects of the white balancing of this disclosure with other computational photography techniques such as high dynamic range (HDR) photography or multi-frame noise reduction (MFNR). For example, the different white balancing applied to different portions of the image frame may be applied to individual frames prior to combining the frames to produce HDR photography or MFNR photography. As another example, the white balancing applied to different portions of the image frame may be applied to the combined HDR photography image frame or the combined MFNR photography image frame.

Other image processing techniques may likewise be modified and enhanced with infrared-based segmentation. For example, auto exposure and auto focus operations may receive the infrared measurement values and use the infrared data in determining an exposure level and determining a focal plane, respectively. For example, the auto focus operation may ignore portions of the image with high infrared values because those values correspond to a distant portion of a scene outside a window. As another example, the auto exposure operation may determine an exposure level or shutter length based on portions of the image with low infrared because those portions are likely to include subjects that are intended objects of the photography. Still other operations may benefit from the infrared measurement values such as computer vision tasks. For example, scene classification, pixel classification, object detection, feature extraction, and/or plane detection may receive and use the infrared measurement values in determining aspects of the image frame.

After an output frame representing the scene is determined by the image signal processor, the view of the scene may be displayed on a device display, saved to a storage device as a picture or a sequence of pictures as a video, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, etc. That is, the image signal processor may obtain incoming frames from one or more image sensors, each coupled to one or more camera lenses, and, in turn, may produce and output a flow of output frames to various output destinations. In such examples, the image signal processor may be configured to produce a flow of output frames that may have reduced ghosting or other artifacts resulting from the temporal filtering.

In one aspect of the disclosure, a method for image processing includes receiving a first image frame and a corresponding set of infrared measurement values. The method may continue with determining a first portion and a second portion of the first image frame based on the set of infrared measurement values. The method may continue with determining a second image frame based on the first image frame by performing operations comprising: applying a first white balancing to the first portion of the first image frame based on image content in the first portion; and applying a second white balancing to the second portion of the first image frame based on image content in the second portion.

In one example application, the method may be applied to determine separate indoor and outdoor regions as first and second portions of the first image frame. The indoor and outdoor regions may be distinguished by thresholding the infrared measurement values such that the indoor region has infrared measurement values below a threshold and the outdoor region has infrared measurement values above the threshold. An indoor portion may be white balanced, by applying a first set of weighting values for color intensities of each of the pixels of the indoor portion, to a lower correlated color temperature (CCT). An outdoor portion may be white balanced, by applying a second set of weighting values for color intensities of each of the pixels of the outdoor portion, to a higher correlated color temperature (CCT).

Although examples of scenes with mixed indoor and outdoor lighting are described in some example applications, the application of different white balancing may be applied to different portions of an image frame illuminated by different illumination sources that can be distinguished by the infrared measurement values. As another example, different indoor lighting sources, such as incandescent lighting and LED lighting, may be distinguished by infrared measurements because a tungsten filament of the incandescent lighting produces more infrared illumination than the semiconductor device of the LED lighting. Further, although infrared measurements are described for distinguishing different light sources within a scene, other measurements may be used to distinguish different portions of the scene. For example, ultraviolet (UV) measurements may also be used to distinguish a natural illumination source from an artificial illumination source. As another example, depth measurements may be used to distinguish a nearby, indoor region illuminated by an artificial illumination source from a far, outdoor region illuminated by a natural illumination source.

In some aspects, the method may be performed for HDR photography in which the input image frame for the white balancing operation is itself a combination of a first image frame and a second image frame captured using different exposure times, different apertures, different lenses, or other different characteristics that may result in improved dynamic range of a fused image when the two image frames are combined. In some aspects, the method may be performed for MFNR photography in which the first image frame and the second image frame are captured using the same or different exposure times. White balancing according to aspects of this disclosure may be applied after the computational photography used for example, to perform HDR or MFNR photography. In some embodiments, the white balancing according to aspects of this disclosure may be applied to the first and second image frames prior to the computational photography that produces the HDR or MFNR photography.

In some aspects, the method may be performed for multiple image sensors with different lens configurations (e.g., W, UW, T). For example, the infrared measurement values (or other data regarding the scene captured in an image frame) may be correlated to two or more image frames captured from two or more cameras with different lens configurations. The different image frames may be processed to determine first, second, or additional portions in each of the image frames that are correlated with each other. The white balancing or other processing may be applied to each of the image frames captured from each of the cameras and the multiple processed image frames combined to generate a fused image frame for output, or one of the multiple processed image frames selected, based on one or more criteria, to be output. In some embodiments, the processing of the separate image frames from the different cameras may be processed by multiple image signal processors, respectively, in parallel. The processing from multiple cameras in a synchronized manner using the infrared measurement values (and/or other data regarding the image frame) may improve the image quality for fusion techniques involving multi-camera HDR and/or subsequent post-processing of files in a photo gallery application to recompose a field of view (FOV) by capturing image frames from multiple cameras (even when the cameras are included in different devices at different locations). The processing from multiple cameras in a synchronized manner may also be useful in enhancing a user experience interacting with the image capture device, such as by masking photometric effects when switching between cameras during a zoom change during preview or video capture. The synchronized processing may reduce the effect of a discontinuous change in color when zooming in or out in a video in a manner that causes the image capture device to change sensors.

In an additional aspect of the disclosure, an apparatus is disclosed that includes at least one processor, and a memory coupled to the at least one processor. The at least one processor is configured to perform any of the methods or techniques described herein. For example, the at least one processor may be configured to perform steps including receiving a first image frame and a corresponding set of infrared measurement values. The processor may also be configured to determine a first portion and a second portion of the first image frame based on the set of infrared measurement values. The processor may further be configured to determine a second image frame based on the first image frame by performing operations comprising: applying a first white balancing to the first portion of the first image frame based on image content in the first portion; and applying a second white balancing to the second portion of the first image frame based on image content in the second portion.

The at least one processor may include an image signal processor or a processor including specific functionality for camera controls and/or processing, such as enabling or disabling the temporal filtering and/or motion compensation. The at least one processor may also or alternatively include an application processor. The methods and techniques described herein may be entirely performed by the image signal processor or the application processor, or various operations may be split between the image signal processor and the application processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

In an additional aspect of the disclosure, a non-transitory computer-readable medium stores instructions that, when executed by a processor, cause the processor to perform operations including those described in the method and techniques described herein. For example, the operations may include receiving a first image frame and a corresponding set of infrared measurement values. The operations may also include determining a first portion and a second portion of the first image frame based on the set of infrared measurement values. The operations may also include determining a second image frame based on the first image frame by performing operations comprising: applying a first white balancing to the first portion of the first image frame based on image content in the first portion; and applying a second white balancing to the second portion of the first image frame based on image content in the second portion.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
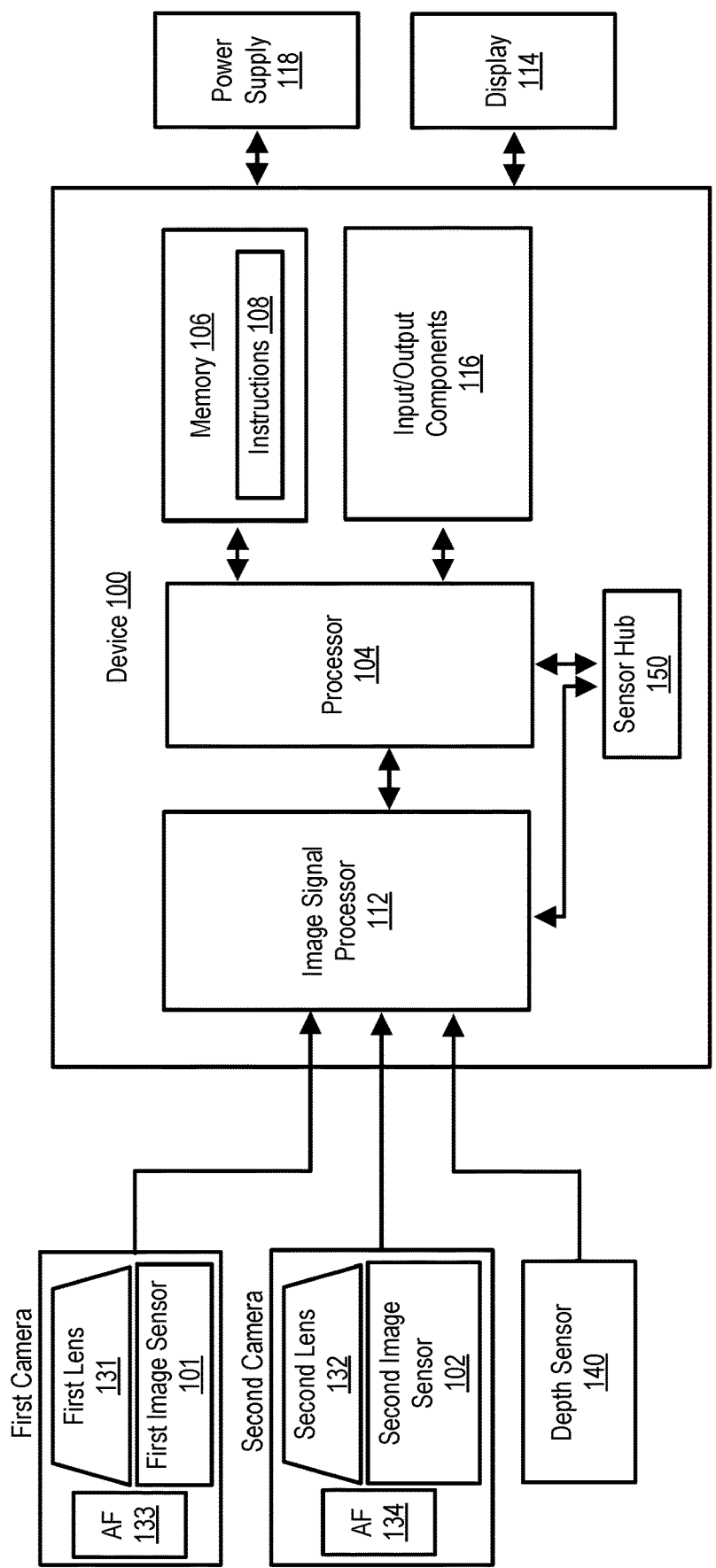
FIG. 1 is a block diagram of a computing device configured to perform one or more of the example techniques described in this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing of captured image frames for photography and video. Particular implementations of the subject matter described in this disclosure may be implemented to realize potential advantages or benefits, such as improved image quality by improving color accuracy in a photograph or a video sequence of image frames. The systems, apparatus, methods, and computer-readable media may be embedded in image capture devices, such as mobile phones, tablet computing devices, laptop computing devices, other computing devices, or digital cameras.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further include an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. Image sensors 101 and/or 102 may be, for example, charge coupled devices (CCD) or CMOS sensors. Depth sensor 140 may be, for example, a single-point or multi-point detector, including one or more of a time of flight (ToF) detector (such as a flood-illumination ToF or a direct ToF detector), a light distance and ranging (LiDAR) device, an infrared sensor, and/or an ultraviolet sensor. In some implementations, the device 100 also includes or is coupled to a processor 104 and a memory 106 storing instructions 108. The device 100 may also include or be coupled to a display 114 and a number of input/output (I/O) components 116, such as a touch screen interface and/or physical buttons. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include one or more transceivers and a baseband processor, may be included for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. Such non-camera sensors may be integrated in the device 100 in some embodiments. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may have associated autofocus (AF) systems 133 and 134, respectively, which adjust the lenses 131 and 132 to focus on a particular focal plane at a certain scene depth from the image sensors 101 and 102. The AF systems 133 and 134 may be assisted by depth sensor 140. The focus depth of the AF systems 133 and 134 may provide depth information regarding the image scene to other components of the device 100, such as the ISP 112, through metadata associated with the image frames captured by the image sensors 101 and 102. The device 100 may perform image processing on the image data from a combination of image sensors located within the device 100 or separate from the device 100.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100. In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include circuitry specifically configured to temporally filter two or more image frames, circuitry specifically configured to implement an infinite impulse response (IIR) filter, and/or circuitry specifically configured to apply motion compensation to an image frame.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including the combining operations of temporal filtering. For example, execution of the instructions can instruct the image signal processor 112 to begin or end capturing an image frame or a sequence of image frames, in which the capture includes temporal filtering as described in embodiments herein. In some embodiments, the processor 104 may include one or more general-purpose processors capable of executing scripts or instructions of one or more software programs, such as instructions 108 stored within the memory 106. For example, the processor 104 may include one or more application processors configured to execute the camera application (or other suitable application for generating images or video) stored in the memory 106. In executing the camera application, the processor 104 may be configured to instruct the image signal processor 112 to perform one or more operations with reference to the image sensors 101 or 102. For example, the camera application may receive a capture command upon which a video comprising a sequence of image frames is captured and processed. Temporal filtering may be applied to one or more image frames in the sequence. The camera application may allow enabling and disabling the temporal filtering and/or configuring parameters of the temporal filtering, such as a number of image frames for combining in the temporal filtering, parameters for determining the application of temporal filtering, and/or an absolute or relative number of random resets to perform per image frame. Execution of instructions 108 outside of the camera application by the processor 104 may also cause the device 100 to perform any number of functions or operations. In some embodiments, the processor 104 may include ICs or other hardware in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

When image frames are captured that contain different light sources with different spectra of light, applying white balancing (e.g., automatic white balancing (AWB)) to the image frame may produce undesired results. For example, the white balancing may not be accurate when the AWB counts statistics across the entire captured image frame if the captured image frame includes light sources with different light temperatures because the whole-frame statistics average out the different light sources. The statistics averaged across different light sources results in any white balancing based on such statistics results in a white balanced image with undesirable colors. Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

In one aspect of a device 100, image frames captured from one or more of the image sensors 101 and 102 may be modified, such as with automatic white balancing based on information regarding different portions of the image frame illuminated by different light sources. For example, infrared measurements may be used to distinguish between a portion of an image frame that is outdoors, and thus illuminated by the sun, and a portion of the image frame that is indoors, and thus illuminated by artificial lighting. Automatic white balancing may determine the presence of these two different portions, such as using infrared measurements, and apply different white balancing to the two portions. One portion may be adjusted based on a first correlated color temperature (CCT) and the other portion may be adjusted based on a second correlated color temperature (CCT). For example, the indoor portion (which may have lower infrared measurements) may be white balanced to a lower CCT and the outdoor portion (which may have higher infrared measurements) may be white balanced to a higher CCT. These and other embodiments of white balancing operations are described with reference to aspects of FIG. 2, FIG. 3, FIG. 4, FIG. 5, FIG. 6, FIG. 7A, FIG. 7B and FIG. 8.

Figure 2:
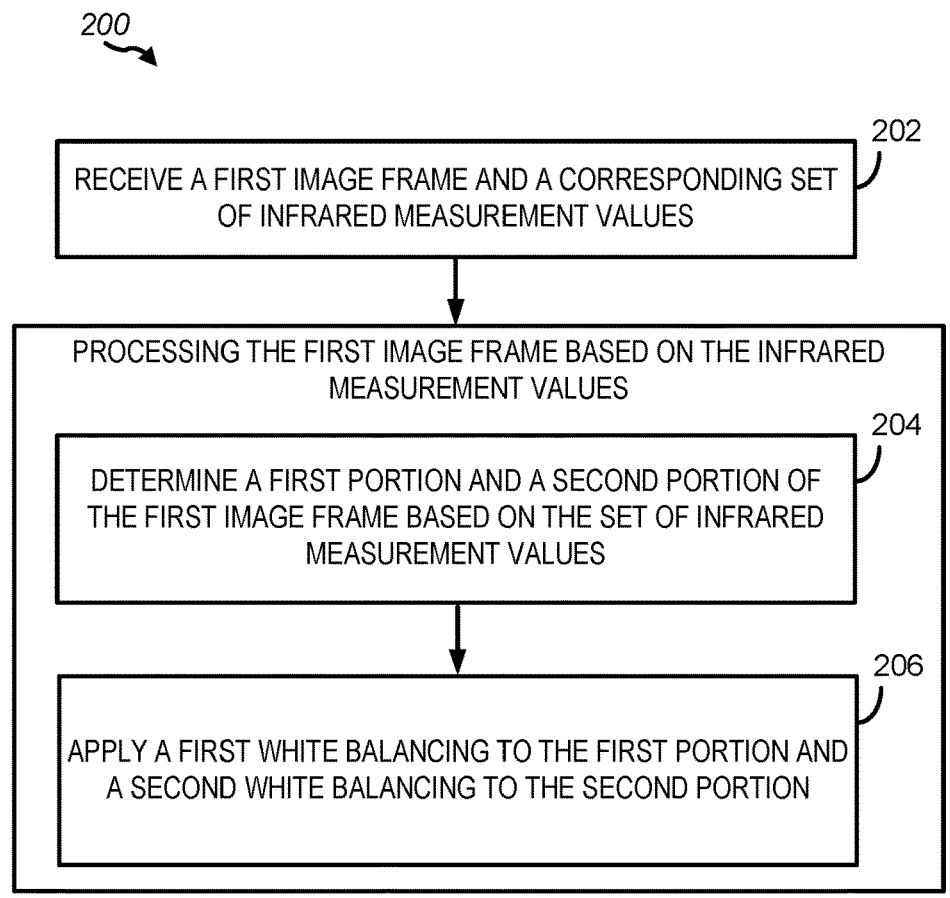
FIG. 2 is flow chart illustrating a method of applying different white balancing to different portions of an image frame according to some embodiments of this disclosure.

FIG. 2 is flow chart illustrating a method of applying different white balancing to different portions of an image frame according to some embodiments of this disclosure. A method 200 includes, at block 202, the receiving of a first image frame and a corresponding set of infrared measurement values. The first image frame may be received from memory, where the image frame was stored earlier, such as after capturing the image frame with an image sensor. The first image frame may alternatively be received from the image sensor for white balancing in real-time as part of a process for generating a preview image display. The infrared measurement values may be received from a file stored in memory, metadata in the first image frame, and/or received from the infrared detector in real-time along with the first image frame. The infrared measurement values may be measured in parallel with a multi-point detector, measured in series with a multi-point detector, or measured in series with a single-point detector.

The method 200 continues to the processing of the first image frame based on the corresponding infrared measurement values, which may include, for example, the processing described in blocks 204 and 206. At block 204, the processing may include the determining of one or more portions of the first image frame based on the set of infrared measurement values. For example, a first portion and second portion of the image frame may be identified through the infrared measurement values. For example, determining multiple portions of the first image frame may include determining an indoor region as a first portion and an outdoor region as a second portion. In another example, determining multiple portions of the first image frame may include determining a first region illuminated by a first light source as a first portion and a second region illuminated by a second light source as a second portion.

The determination of different portions may be based on the infrared measurement values by applying a threshold on the infrared measurement values to segment the measurement values into two or more groups. The threshold may be a predetermined value or may be determined based on the infrared measurement values of a particular image frame. For example, statistical analysis on the infrared measurement values may identify a bimodal distribution of values and the values associated with each of the peaks may be determined as values correlating to a first and second portion of the image frame. Similarly, statistical analysis may identify multiple peaks or multiple clustering of values, and the values associated with each peak or cluster may be considered as different portions.

The determination of different portions may also or alternatively be based on expected shapes for portions of the scene. For example, pixels of a scene illuminated by the same illumination source may be expected to be contiguous with other pixels illuminated by the same illumination source. Determination of the portions of the image frame may be based on other criteria, such as thresholding, but then associate pixels between two regions that meet the criteria along with the two regions to form a first portion of the image frame. In some embodiments this may be performed with a flood fill function that aggregates pixels associated with the thresholded infrared measurement values into a contiguous portion. The flood fill function may use the color of the pixels in determining which pixels to include in a portion. For example, the flood fill may use a difference between the color of neighboring pixels or the rate of change of color between neighboring pixels when defining a portion. In one application, pixels in the vicinity of a thresholded infrared measurement value may be aggregated only if the colors of neighboring pixels are within a threshold difference from each other or if the rate of change between neighboring pixels is less than a threshold amount. Computer vision analysis may also be used to identify features that that may assist in defining contiguous regions around thresholded values when determining a first, second, third, or more portions of the image frame, which is described in more detail with reference to FIG. 7A, FIG. 7B and FIG. 8 below.

The determination of different portions may also or alternatively be based on metadata regarding the image frame. For example, the time of day and/or the date of the capture of the image frame may indicate whether outdoor regions of the scene are illuminated by the direct overhead sunlight, evening sunlight, or moonlight, each of which may have a different color temperature for white balancing. As another example, the location of the capture of the image frame may indicate whether the image scene is an outdoor scene, such as when the location corresponds to a location whether there is no building, or may be a mixed scene, such as when the location corresponds to a building location.

The processing of the first image frame in method 200, may include, at block 206, the determining of a second image frame (e.g., a corrected image frame) by applying different white balancing to the different portions of the first image frame identified at block 204. Different white balancing may be applied to the different portions based on the raw statistics of each of the portions. In some embodiments, the white balancing of block 206 may use automatic white balancing (AWB) based on the content of the portions. Raw statistics may be computed for pixels in the first portion of the image frame, and automatic white balancing (AWB) applied to the first portion of the image based on the raw statistics computed for the first portion of the image. In some embodiments, the white balancing of block 206 may be based on user input. For example, a user may specify preferred color temperatures for different illumination sources, and white balancing applied based on those preferences. As another example, a user may be prompted after determining the portions at block 204 to specify a white balancing operation for each of the portions, such as by presenting the user with a sliding bar specifying temperatures from warm to cool.

The white balancing operations may be repeated for each additional portion of the image frame determined at block 204 based on the statistics associated with pixels associated with the determined regions. Separately white balancing the different portions of the image frame may improve the appearance of the image by producing more natural colors within the image frame, particularly in scenes with multiple illumination sources of different color temperatures. This improves image quality over white balancing the entire image frame based on statistics averaged over the entire image frame, which may result in color casts from one portion of the image frame to another portion.

In some examples, the white balancing of block 206 may include applying a first white balancing to the first portion by applying a lower correlated color temperature (CCT) to the indoor portion and applying a second white balancing to the second portion by applying a higher correlated color temperature (CCT) to the outdoor portion. The first and second white balancing operations may apply different weighting values to the color intensities of the pixels in the different portions. For example, the white balancing of block 206 may include applying the lower CCT to the indoor portion comprises applying a first set of weighting values for color intensities corresponding to pixels in the indoor portion and applying the higher CCT to the outdoor portion comprises applying a second set of weighting values for color intensities corresponding to pixels in the outdoor portion.

Figure 3:
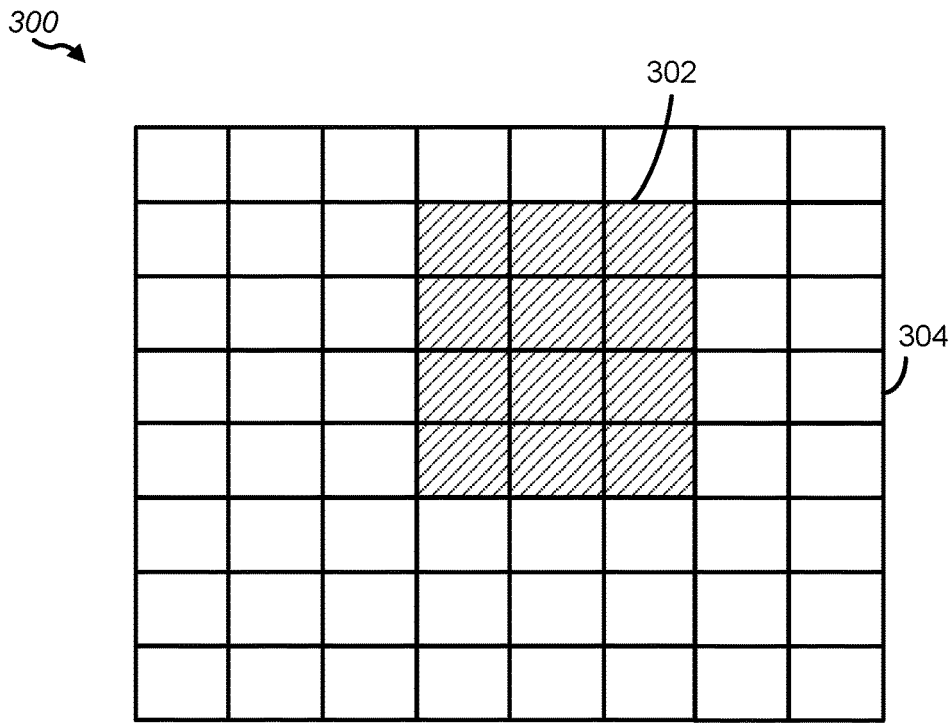
FIG. 3 is a block diagram illustrating example portions of an image frame that may be determined according to some embodiments of this disclosure.
Figures 4, 5:
FIG. 4 is a block diagram illustrating example infrared measurement values that may be used to determine portions of an image frame according to some embodiments of the disclosure.
FIG. 5 is a line drawing illustrating a scene with an indoor and outdoor region that may be determined to have a first and second portion based on infrared measurement values according to some embodiments of this disclosure.

An application of one embodiment of the method 200 of FIG. 2 is demonstrated with reference to FIG. 3, FIG. 4, and FIG. 5. FIG. 3 is a block diagram illustrating example portions of an image frame that may be determined according to some embodiments of this disclosure. An image frame 300 may be received at block 202 of method 200, along with a corresponding set of infrared measurement values. A first portion 302 and a second portion 304 may be determined, at block 204 of method 200, from within the image frame 300 based on one or more of infrared measurement values, computer vision (CV) analysis, pixel color, and/or other metadata associated with the image frame. Example infrared measurement values corresponding to the image frame 300 are shown in FIG. 4. FIG. 4 is a block diagram illustrating example infrared measurement values that may be used to determine portions of an image frame according to some embodiments of the disclosure. A threshold of 50 applied to the infrared measurement values of FIG. 4 can be used to determine a shaded region corresponding to the first portion 302 with infrared measurement values above 50 and a second portion 304 with infrared measurement values below 50.

The infrared measurement values of FIG. 4 may correspond to a photograph shown in FIG. 5. FIG. 5 is a line drawing illustrating a scene with an indoor and outdoor region that may be determined to have a first and second portion based on infrared measurement values according to some embodiments of this disclosure. Infrared measurement values above the threshold used to determine first portion 302 may correspond to a window 502 in a scene 500 with mixed illumination sources. Objects in the window 502 corresponding to first portion 302 may be illuminated by the sun, while objects in the interior of the building around window 502 may be illuminated by an artificial illumination source. Different white balancing may be applied to the first portion 302 than to the second portion 304 to produce a more natural photograph of the mixed illumination source scene 500.

Figure 6:
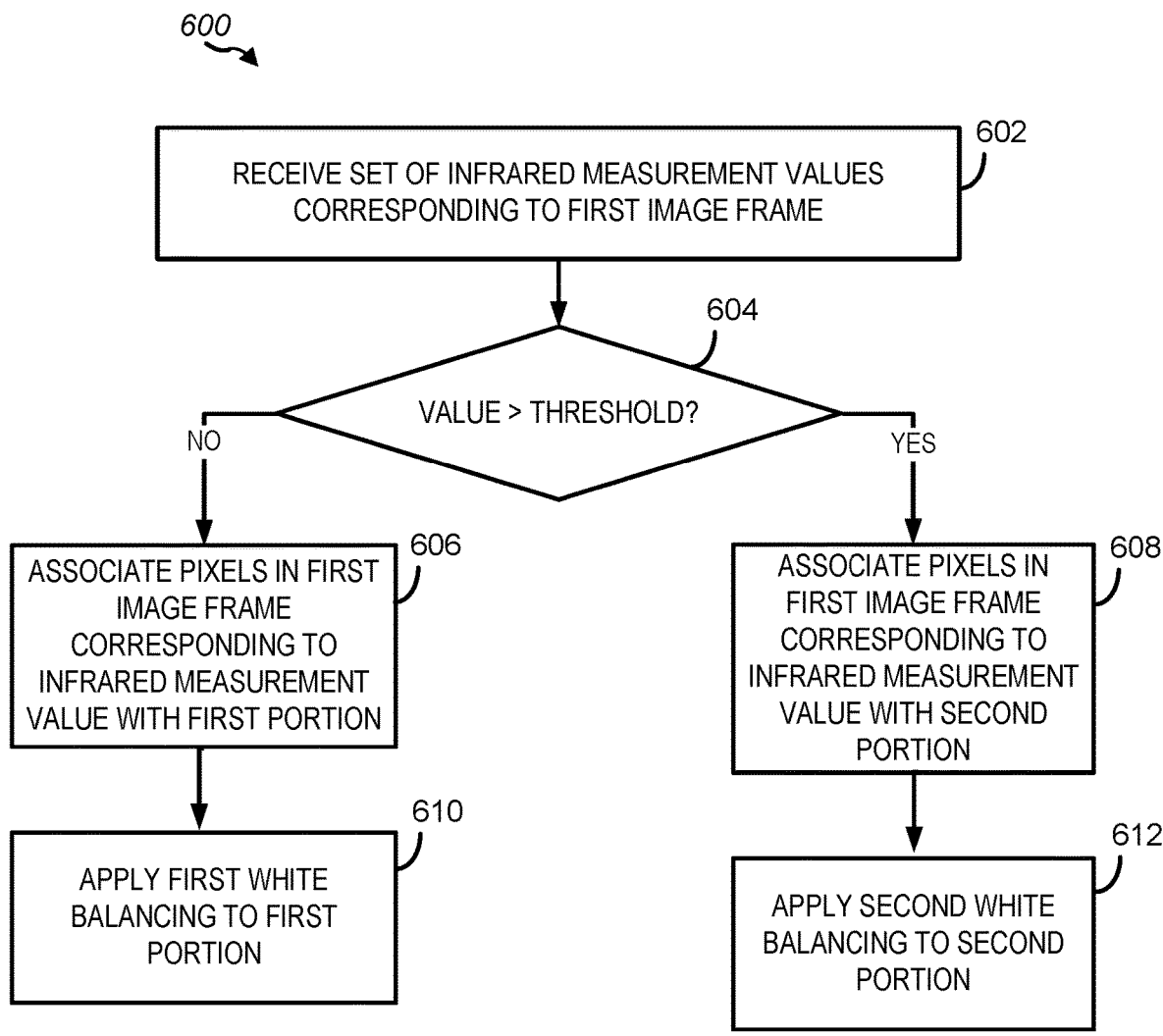
FIG. 6 is a flow chart illustrating a method of distinguishing a first and second portion of an image frame based on thresholding infrared measurement values according to some embodiments of this disclosure.

FIG. 6 is a flow chart illustrating a method of distinguishing a first and second portion of an image frame based on thresholding infrared measurement values according to some embodiments of this disclosure. The method 600 includes receiving a set of infrared measurement values corresponding to a first image frame at block 602. For each infrared measurement value, the value is compared to a threshold at block 604. If the value is below the threshold then the method 600 includes associating pixels in the first image frame corresponding to the infrared measurement value with a first portion of the image frame.

When the infrared measurement is performed at a lower resolution that the resolution of the image frame, the associating of block 606 may result in more than one pixel being associated with the first portion. For example, if the infrared measurements are sampled in an 8×8 array for an image frame of 4032×2268, each infrared measurement value may be associated with a 504×283 block of pixels in the image frame. The number of pixels associated with the first portion at block 606 based on the infrared measurement thresholding of block 604 may also vary from value to value based on refinements to the defining of the first portion based on other characteristics, such as features identified by computer vision (CV) analysis, metadata, and pixel colors as described above. If the value is above the threshold then the method 600 includes associating pixels in the first image frame corresponding to the infrared measurement value with a second portion of the image frame at block 608. White balancing is applied after the image frame is segmented into two or more portions at blocks 606 and 608 based on the thresholding at block 604. First white balancing is applied to the first portion at block 610; and second white balancing is applied to the second portion at block 612. A corrected image frame is produced from the white balanced portions, and the corrected image frame may be the same or similar resolution as the first image frame.

Figure 7A:
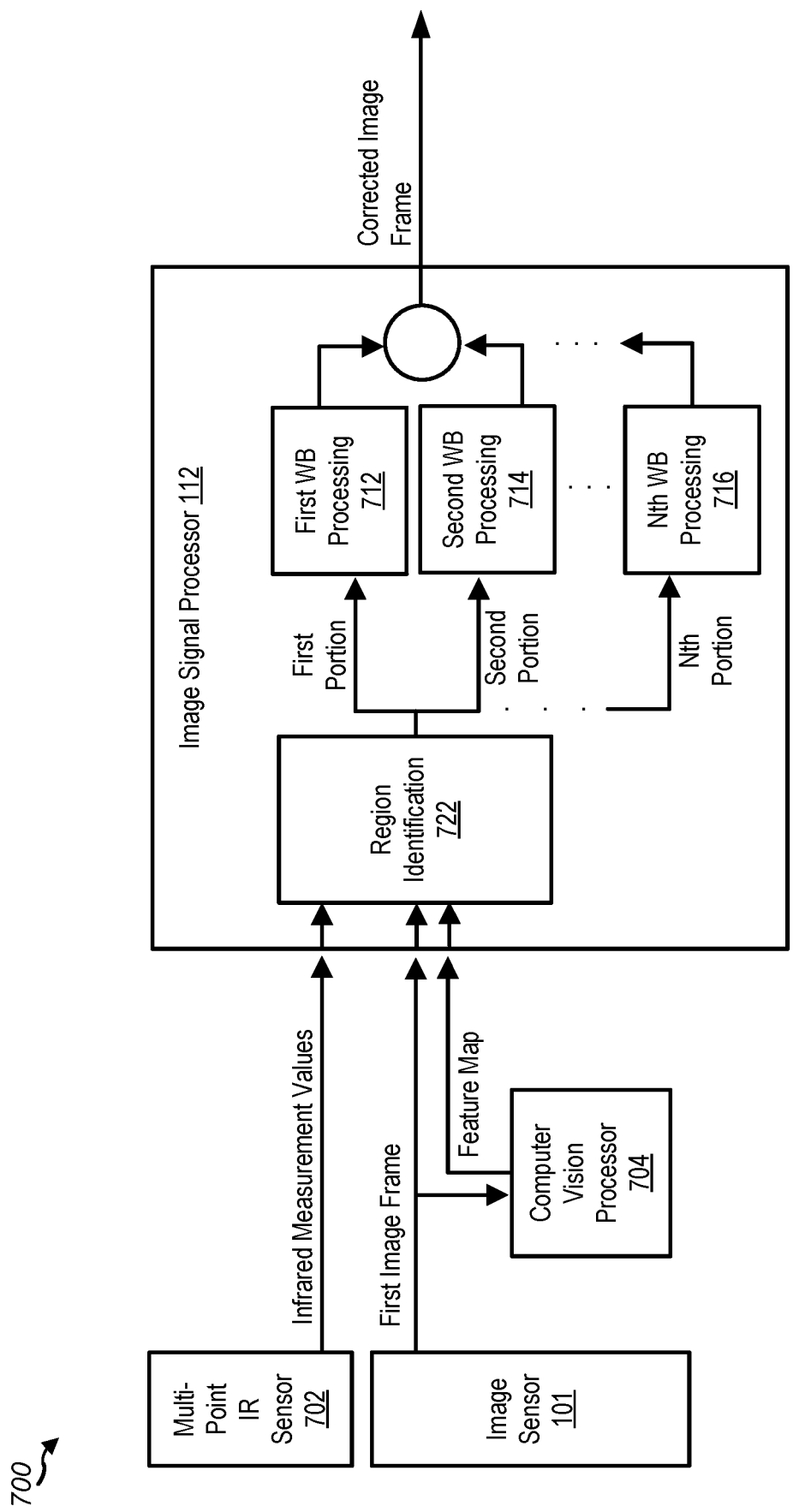
FIG. 7A is a block diagram illustrating different white balancing operations on different portions of an image frame according to some embodiments of this disclosure.

A block diagram for processing an image frame with an image signal processor using computer vision (CV) analysis and/or multi-point infrared measurements is shown in FIG. 7A. FIG. 7A is a block diagram illustrating different white balancing operations on different portions of an image frame according to some embodiments of this disclosure. A system 700 may include image signal processor 112 coupled to image sensor 101, multi-point IR sensor 702, and computer vision processor 704. The multi-point IR sensor 702 may provide the infrared measurement values to the image signal processor 112. The image sensor 101 may provide a first image frame to the computer vision processor 704 and the image signal processor 112.

The computer vision processor 704 may analyze the image frame and may generate a feature map that is provided to the image signal processor. The feature map may include a listing of detected features and locations of the features. For example, the detected features may include a grouping of objects expected to be located outdoor (e.g., trees, umbrellas, shrubs, etc.) and a grouping of objects expected to be located indoor (e.g., desk, lamp, television). The location of the indoor and outdoor objects may be used in determining the portions of the image frame corresponding to indoor regions and outdoor regions. For example, the feature map may be used to corroborate and/or refine portions of the image frame identified from the infrared measurement values. In some embodiments, the computer vision processor 704 may determine the presence and locations of illumination sources within the image frame (e.g., sun, moon, fluorescent light, desk lamp, etc.). A determination of the location of the illumination source and the direction of the illumination source may be used to determine a portion of the scene illuminated by that illumination source and used to define the first and second portions.

The image signal processor 112 may process the data received from the multi-point IR sensor 702, the image sensor 101, the computer vision processor 704, and/or metadata received from other sensors to generate a corrected image frame from the first image frame. The corrected image frame may have improved coloring that appears more natural to the human eye in scenes with mixed illumination sources. The image signal processor 112 may perform region identification 722 on the first image frame to determine a first portion, a second portion, and/or additional portions based on the feature map, the infrared measurement values, and/or metadata. The first portion and the second portion of the image frame may be output from the region identification 722 to first and second AWB processing 712 and 714, respectively. The region identification 722 is not limited to two portions, but may be expanded to include identifying N portions, in which N is a configured value and/or a value determined based on content of the first image frame, feature map, infrared measurement values, and/or metadata. Additional N portions may each be processed through additional AWB processing 716 and combined to form the corrected image frame.

The AWB processing 712 and 714 may apply a white balancing by adjusting weighting of the colors for each pixel. One pixel format is RGB, in which each pixel has a red value, a green value, and a blue value. During white balancing, the weighting of each of the red, green, and blue values may be adjusted to modify the color temperature. In one embodiment of a white balancing process, the portion of the image frame input to the AWB processing 712 and 714 may be gray filtered to determine regions that are likely to be gray regions. These regions may then be partitioned into plurality of clusters, and selected regions mapped onto a predetermined coordinate system. The centroid of each of the clusters may be computed within the coordinate system. One or more reference illuminant points may be located within the coordinate system. The distance between each of the centroids of the clusters and each of the reference illuminant points may be determined. The illuminant corresponding to each of the clusters may be estimated, and from the estimates a final illuminant may be determined. The white balance gains may be determined based on the illuminant, and the white balance gains applied to the portions. Other embodiments of the white balancing technique may employ different AWB processing 712 and 714 to the determined portions.

The result of the differently processed first and second portions to are combined to produce the corrected image frame. The combination may result in pixels of the corrected image frame being either pixels from the corrected first portion output from AWB processing 712 or pixels from the corrected second portion output from AWB processing 714. The combination may also include blending pixels at the boundaries between the first portion and the second portion to reduce an appearance of a hard boundary resulting from the different white balancing of the first portion and the second portion. The blending may include weighted averaging of pixels within a certain distance of the boundary between the first portion and the second portion with neighboring pixels or other pixels within a certain distance of the boundary. The blending may also or alternatively include a weighted averaging of pixels within a certain distance of the boundary with original pixels in the first image frame prior to white balancing, alpha blending, and/or anisotropic blending based on scene content (e.g., edges of portions, edges of detected objects, local contrast, and/or features).

Figure 8:
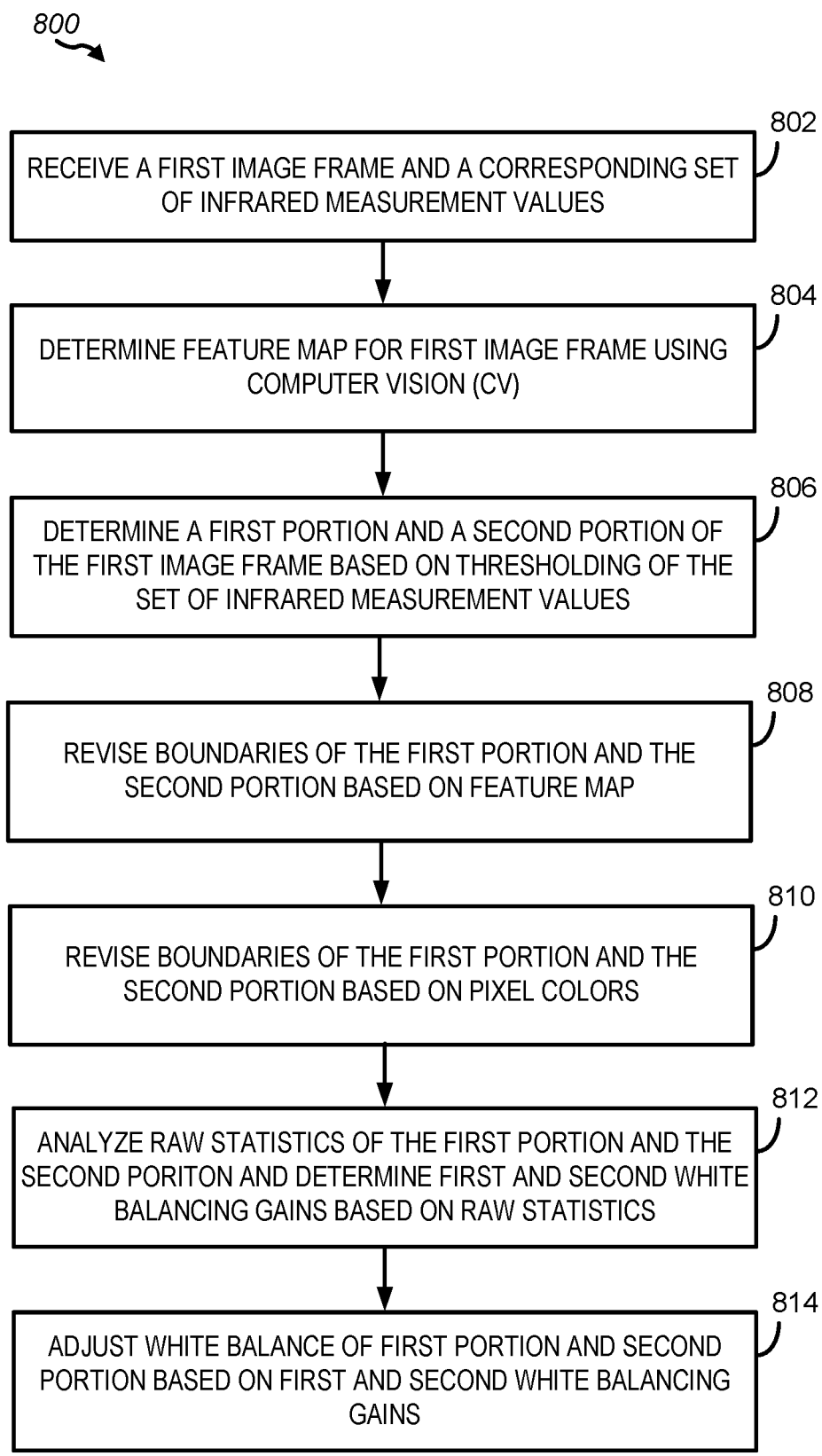
FIG. 8 is a flow chart illustrating a method of correcting white balancing in different portions of an image frame using infrared measurement values and computer vision according to some embodiments of the disclosure.

One method for correcting images using the system of FIG. 7A is shown in FIG. 8. FIG. 8 is a flow chart illustrating a method of correcting white balancing in different portions of an image frame using infrared measurement values and computer vision according to some embodiments of the disclosure. A method 800 includes receiving a first image frame and a corresponding set of infrared measurement values. A feature map may be determined for the first image frame using computer vision (CV) analysis at block 804. At block 806, a first portion and a second portion may be segmented based on threshold of the infrared measurement values.

At block 808, the boundaries of the first portion and the second portion within the first image frame may be revised based on the feature map. For example, the boundaries of a first portion associated with an infrared measurement value below a threshold may be expanded to include some pixels, such as pixels near the border of the first and second portions, that were associated with an infrared measurement value above the threshold. The boundaries may be extended, for example, by identifying a feature that spans the first portion and the second portion that is likely to be illuminated by the same illumination source. Expanding the boundaries of the first or second portion in such a manner based on the feature map may improve the natural appearance of lighting of objects in the scene. At block 810, the boundaries of the first and second portions may be revised, similar to at block 808, but based on pixel colors. At block 812, the raw statistics of the first portion and the second portion may be analyzed to determine a first and second white balancing gains based on the raw statistics. Those white balancing gains may be applied at block 814 to adjust white balancing in the first portion and the second portion.

Figure 7B:
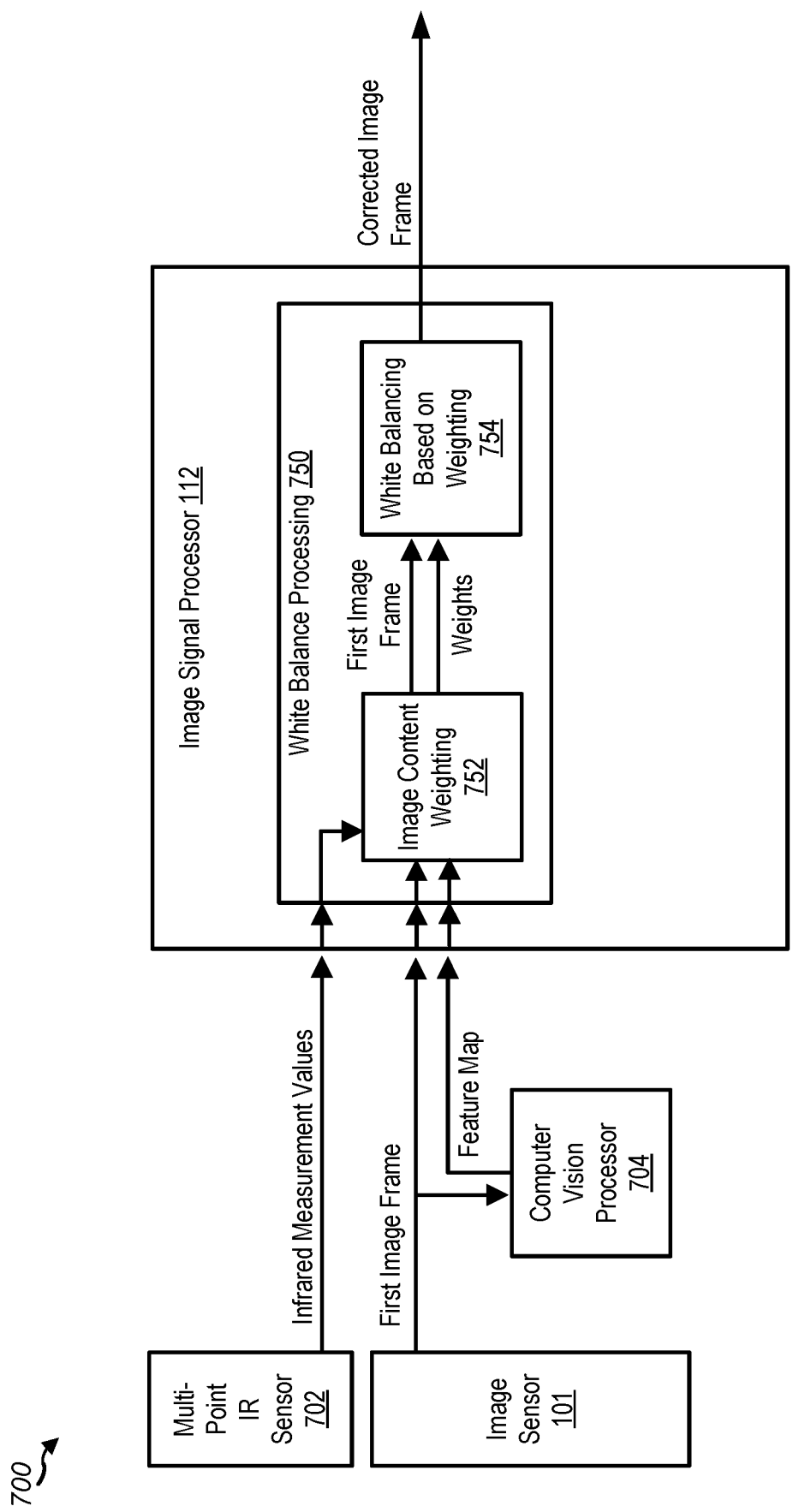
FIG. 7B is a block diagram illustrating different white balancing operations on different portions of an image frame according to some embodiments of this disclosure.

The embodiments of FIG. 7A and FIG. 8 describe application of separate white balancing to different portions of the image frame. However, a global white balancing operation may be performed additionally to or alternatively to the local white balancing of separate portions. A global white balancing is described with reference to FIG. 7B. FIG. 7B is a block diagram illustrating different white balancing operations on different portions of an image frame according to some embodiments of this disclosure. Global white balance processing of block 750 receives as input the first image frame and the infrared measurement values at image content weighting 752. The weighting 752 determines weighting adjustments for a white balancing operation, such as the application of automatic white balancing (AWB). The weights may be based on the infrared measurement values, which indicate different characteristics within the first image frame, such as where in the first image frame different indoor regions and outdoor regions may exist. The weights may also or alternatively be based on other characteristics. The weights may be provided to perform white balancing based on weighing 754, which applies a single white balancing operation to the entire first image frame based on the weighting to generate the corrected image frame. The general global white balancing may be performed based on the weighted average for the image frame contents, in which the image frame is separated into cells of a grid and each grid cell has a weight contributing to a final white balancing.

In one or more aspects, techniques for processing an image frame may include using infrared measurements to enhance the image or perform computational photography, such as any single aspect or any combination of aspects described below or in connection with one or more other processes or devices described elsewhere herein. In one or more aspects, performing a method may include receiving a first image frame and a corresponding set of infrared measurement values (and/or other data regarding the image frame). The method may also include processing the first image frame by applying white balancing to the first image frame based on the corresponding set of infrared measurement values. Additionally, the method may be performed by an apparatus including a wireless device, such as a user equipment (UE). In some implementations, the apparatus may include at least one processor, and a memory coupled to the processor. The processor may be configured to perform operations described herein with respect to the apparatus. In some other implementations, the method may be embedded in a non-transitory computer-readable medium in program code recorded thereon and the program code may be executable by a computer for causing the computer to perform operations described herein with reference to the apparatus. In some implementations, the method may be performed by one or more means configured to perform operations described herein. In some implementations, a method of wireless communication may include one or more operations described herein with reference to the apparatus.

In a second aspect, in combination with the first aspect, the method may include one or more of determining a first portion and a second portion of the first image frame based on the set of infrared measurement values; applying a first white balancing to the first portion of the first image frame in the first portion; and/or applying a second white balancing to the second portion of the first image frame in the second portion.

In a third aspect, in combination with one or more of the first aspect or the second aspect, the method may include determining a first region illuminated by a first light source as the first portion of the first image frame; and/or determining a second region illuminated by a second light source as the second portion of the first image frame.

In a fourth aspect, in combination with one or more of the first through third aspects, the method may include determining an indoor region as the first portion of the first image frame; determining an outdoor region as the second portion of the first image frame; applying a lower correlated color temperature (CCT) to the indoor region; and/or applying a higher correlated color temperature (CCT) to the outdoor region.

In a fifth aspect, in combination with one or more of the first through fourth aspects, the method may include determining a portion of the first image frame with corresponding infrared measurement values below a first threshold; and/or determining a portion of the first image frame with corresponding infrared measurement values above the first threshold.

In a sixth aspect, in combination with one or more of the first through fifth aspects, the method may include determining the first region of pixels based on pixels in the first region having color values within a threshold distance; and/or determining the second region of pixels based on pixels in the second region having color values within a threshold distance.

In a seventh aspect, in combination with one or more of the first through sixth aspects, the method may include applying the first white balancing comprises applying the first white balancing based on image content of the first portion; and/or applying the second white balancing comprises applying the second white balancing based on image content of the first portion.

In an eighth aspect, in combination with one or more of the first through seventh aspects, the method may include performing a computer vision analysis of the first image frame to identify a plurality of features in the first image frame; identifying a first set of pixels of the first image frame as the first portion based on identifying a first contiguous set of the corresponding set of infrared measurement values that are below a first threshold and a first set of the plurality of features corresponding to the first contiguous set; and/or identifying a second set of pixels of the first image frame as the second portion based on identifying a second contiguous set of the corresponding set of infrared measurement values that are above a first threshold and a second set of the plurality of features corresponding to the second contiguous set.

In a ninth aspect, in combination with one or more of the first through eighth aspects, the method may include receiving a set of time of flight (ToF) measurements from a time-of-flight sensor as the infrared measurement values.

In a tenth aspect, in combination with one or more of the first through ninth aspects, the method may include receiving a set of light detection and ranging (LiDAR) measurements from a LiDAR sensor as the infrared measurement values.

In one or more aspects, techniques for supporting a device, including a processor; and a memory coupled to the processor and storing instructions that, when executed by the processor, cause the device to perform operations that may include additional aspects, such as any single aspect or any combination of aspects described below or in connection with one or more other processes or devices described elsewhere herein. In an eleventh aspect, supporting image processing using infrared measurement values may include an apparatus configured to receive a first image frame and a corresponding set of infrared measurement values (and/or other data regarding the image frame). The apparatus may be also configured to process the first image frame by applying white balancing to the first image frame based on the corresponding set of infrared measurement values. Additionally, the apparatus may perform or operate according to one or more aspects as described below. In some implementations, the apparatus includes a wireless device, such as a user equipment (UE) or base station (BS), or an infrastructure component, such as a cloud-based server. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein.

In a twelfth aspect, in combination with the eleventh aspect, the apparatus may be configured for determining a first portion and a second portion of the first image frame based on the set of infrared measurement values; applying a first white balancing to the first portion of the first image frame in the first portion; and/or applying a second white balancing to the second portion of the first image frame in the second portion.

In a thirteenth aspect, in combination with the eleventh aspect through the twelfth aspect, the apparatus may be configured for determining a first region illuminated by a first light source as the first portion of the first image frame; and/or determining a second region illuminated by a second light source as the second portion of the first image frame.

In a fourteenth aspect, in combination with the eleventh aspect through the thirteenth aspect, the apparatus may be configured for determining an indoor region as the first portion of the first image frame; determining an outdoor region as the second portion of the first image frame; applying a lower correlated color temperature (CCT) to the indoor region; and/or applying a higher correlated color temperature (CCT) to the outdoor region.

In a fifteenth aspect, in combination with the eleventh aspect through the fourteenth aspect, the apparatus may be configured for determining a portion of the first image frame with corresponding infrared measurement values below a first threshold; and/or determining a portion of the first image frame with corresponding infrared measurement values above the first threshold.

In a sixteenth aspect, in combination with the eleventh aspect through the fifteenth aspect, the apparatus may be configured for determining the first region of pixels based on pixels in the first region having color values within a threshold distance; and/or determining the second region of pixels based on pixels in the second region having color values within a threshold distance.

In a seventeenth aspect, in combination with the eleventh aspect through the sixteenth aspect, the apparatus may be configured for applying the first white balancing comprises applying the first white balancing based on image content of the first portion; and/or applying the second white balancing comprises applying the second white balancing based on image content of the first portion.

In a eighteenth aspect, in combination with the eleventh aspect through the seventeenth aspect, the apparatus may be configured for performing a computer vision analysis of the first image frame to identify a plurality of features in the first image frame; identifying a first set of pixels of the first image frame as the first portion based on identifying a first contiguous set of the corresponding set of infrared measurement values that are below a first threshold and a first set of the plurality of features corresponding to the first contiguous set; and/or identifying a second set of pixels of the first image frame as the second portion based on identifying a second contiguous set of the corresponding set of infrared measurement values that are above a first threshold and a second set of the plurality of features corresponding to the second contiguous set.

In a nineteenth aspect, in combination with the eleventh aspect through the eighteenth aspect, the apparatus may be configured for receiving a set of time of flight (ToF) measurements from a time-of-flight sensor as the infrared measurement values.

In a twentieth aspect, in combination with the eleventh aspect through the nineteenth aspect, the apparatus may be configured for receiving a set of light detection and ranging (LiDAR) measurements from a LiDAR sensor as the infrared measurement values.

In one or more aspects, techniques for supporting a non-transitory computer-readable medium storing instructions that, when executed by a processor of a device, cause the device to perform operations may include additional aspects, such as any single aspect or any combination of aspects described below or in connection with one or more other processes or devices described elsewhere herein. In a twenty-first aspect, supporting image processing using infrared measurement values may include a non-transitory computer-readable medium storing instructions that, when executed by a processor of a device, cause the device to perform operations including receiving a first image frame and a corresponding set of infrared measurement values (and/or other data regarding the image frame); and/or processing the first image frame by applying white balancing to the first image frame based on the corresponding set of infrared measurement values. Additionally, the instructions cause an apparatus to perform or operate according to one or more aspects as described below. In some implementations, the apparatus includes a wireless device, such as a base station (BS) or user equipment (UE), or includes an infrastructure device, such as a cloud-based server. In some implementations, the apparatus may include at least one processor, and a memory coupled to the processor. In some aspects, the processor is an image signal processor that further includes circuitry configured to perform other image functions described herein. The processor may be configured to perform operations described herein with respect to the apparatus. In some other implementations, the non-transitory computer-readable medium having program code recorded thereon and the program code may be executable by a computer for causing the computer to perform operations described herein with reference to the apparatus.

In a twenty-second aspect, in combination with the twenty-first aspect, the instructions may cause the device to perform operations including determining a first portion and a second portion of the first image frame based on the set of infrared measurement values; applying a first white balancing to the first portion of the first image frame in the first portion; and/or applying a second white balancing to the second portion of the first image frame in the second portion.

In a twenty-third aspect, in combination with the twenty-first through twenty-second aspects, the instructions may cause the device to perform operations including determining a first region illuminated by a first light source as the first portion of the first image frame; and/or determining a second region illuminated by a second light source as the second portion of the first image frame.

In a twenty-fourth aspect, in combination with the twenty-first through twenty-third aspects, the instructions may cause the device to perform operations including determining an indoor region as the first portion of the first image frame; determining an outdoor region as the second portion of the first image frame; applying a lower correlated color temperature (CCT) to the indoor region; and/or applying a higher correlated color temperature (CCT) to the outdoor region.

In a twenty-fifth aspect, in combination with the twenty-first through twenty-fourth aspects, the instructions may cause the device to perform operations including determining a portion of the first image frame with corresponding infrared measurement values below a first threshold; and/or determining a portion of the first image frame with corresponding infrared measurement values above the first threshold.

In a twenty-sixth aspect, in combination with the twenty-first through twenty-fifth aspects, the instructions may cause the device to perform operations including determining the first region of pixels based on pixels in the first region having color values within a threshold distance; and/or determining the second region of pixels based on pixels in the second region having color values within a threshold distance.

In a twenty-seventh aspect, in combination with the twenty-first through twenty-sixth aspects, the instructions may cause the device to perform operations including applying the first white balancing comprises applying the first white balancing based on image content of the first portion; and/or applying the second white balancing comprises applying the second white balancing based on image content of the first portion.

In a twenty-eighth aspect, in combination with the twenty-first through twenty-seventh aspects, the instructions may cause the device to perform operations including performing a computer vision analysis of the first image frame to identify a plurality of features in the first image frame; identifying a first set of pixels of the first image frame as the first portion based on identifying a first contiguous set of the corresponding set of infrared measurement values that are below a first threshold and a first set of the plurality of features corresponding to the first contiguous set; and/or identifying a second set of pixels of the first image frame as the second portion based on identifying a second contiguous set of the corresponding set of infrared measurement values that are above a first threshold and a second set of the plurality of features corresponding to the second contiguous set.

In a twenty-ninth aspect, in combination with the twenty-first through twenty-eighth aspects, the instructions may cause the device to perform operations including receiving a set of time of flight (ToF) measurements from a time-of-flight sensor as the infrared measurement values.

In a thirtieth aspect, in combination with the twenty-first through twenty-ninth aspects, the instructions may cause the device to perform operations including receiving a set of light detection and ranging (LiDAR) measurements from a LiDAR sensor as the infrared measurement values.

In one or more aspects, techniques for supporting processing of image frames based on infrared measurement values of the scene captured in the image frames may be implemented in or by a device, including a first image sensor configured with a first field of view, a processor coupled to the first image sensor, and a memory coupled to the processor. The processor is configured to perform steps including additional aspects, such as any single aspect or any combination of aspects described below or in connection with one or more other processes or devices described elsewhere herein. In a thirty-first aspect, supporting image processing may include a device configured to receive a first image frame captured at a first time. The device may further include a multi-point IR detector and is further configured for receiving a corresponding set of infrared measurement values from the multi-point IR detector, and processing, with the processor (e.g., an image signal processor) the first image frame by applying white balancing to the first image frame based on the corresponding set of infrared measurement values. Additionally, the device may perform or operate according to one or more aspects as described below. In some implementations, the device includes a wireless device, such as a base station (BS) or user equipment (UE), or an infrastructure device, such as a cloud-based server. In some implementations, the device may include at least one processor, and a memory coupled to the processor, wherein the processor may be configured to perform operations described herein with respect to the device. In some other implementations, the device may include a non-transitory computer-readable medium having program code recorded thereon and the program code may be executable by the device for causing the device to perform operations described herein with reference to the device. In some implementations, the device may include one or more means configured to perform operations described herein.

In a thirty-second aspect, in combination with the thirty-first aspect, the processor is further configured for determining a first portion and a second portion of the first image frame based on the set of infrared measurement values; applying a first white balancing to the first portion of the first image frame in the first portion; and/or applying a second white balancing to the second portion of the first image frame in the second portion.

In a thirty-third aspect, in combination with one or more of the thirty-first through the thirty-second aspects, the processor is further configured for determining a first region illuminated by a first light source as the first portion of the first image frame; and/or determining a second region illuminated by a second light source as the second portion of the first image frame.

In a thirty-fourth aspect, in combination with one or more of the thirty-first through the thirty-third aspects, the processor is further configured for determining an indoor region as the first portion of the first image frame; determining an outdoor region as the second portion of the first image frame; applying a lower correlated color temperature (CCT) to the indoor region; and/or applying a higher correlated color temperature (CCT) to the outdoor region.

In a thirty-fifth aspect, in combination with one or more of the thirty-first through the thirty-fourth aspects, the processor is further configured for determining a portion of the first image frame with corresponding infrared measurement values below a first threshold; and/or determining a portion of the first image frame with corresponding infrared measurement values above the first threshold.

In a thirty-sixth aspect, in combination with one or more of the thirty-first through the thirty-fifth aspects, the processor is further configured for determining the first region of pixels based on pixels in the first region having color values within a threshold distance; and/or determining the second region of pixels based on pixels in the second region having color values within a threshold distance.

In a thirty-seventh aspect, in combination with one or more of the thirty-first through the thirty-sixth aspects, the processor is further configured for applying the first white balancing comprises applying the first white balancing based on image content of the first portion; and/or applying the second white balancing comprises applying the second white balancing based on image content of the first portion.

In a thirty-eighth aspect, in combination with one or more of the thirty-first through the thirty-seventh aspects, the processor is further configured for performing a computer vision analysis of the first image frame to identify a plurality of features in the first image frame; identifying a first set of pixels of the first image frame as the first portion based on identifying a first contiguous set of the corresponding set of infrared measurement values that are below a first threshold and a first set of the plurality of features corresponding to the first contiguous set; and/or identifying a second set of pixels of the first image frame as the second portion based on identifying a second contiguous set of the corresponding set of infrared measurement values that are above a first threshold and a second set of the plurality of features corresponding to the second contiguous set.

In a thirty-ninth aspect, in combination with one or more of the thirty-first through the thirty-eighth aspects, the device further includes a time of flight (ToF) measurement device as the multi-point IR detector, and the processor is further configured for receiving a set of time of flight (ToF) measurements from a time-of-flight sensor as the infrared measurement values.

In a fortieth aspect, in combination with one or more of the thirty-first through the thirty-ninth aspects, the device further includes a light detection and ranging (LiDAR) device as the multi-point IR detector, and the processor is further configured for receiving a set of light detection and ranging (LiDAR) measurements from a LiDAR sensor as the infrared measurement values.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIG. 1 and FIG. 7A include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general-purpose single- or multi-core processor, a digital signal processor (DSP), an application-specific integrated circuit (ASIC), a field programmable gate array (FPGA) or other programmable or fixed logic device, discrete gate or transistor logic, discrete hardware components, or any combination thereof designed to perform the functions described herein. A general-purpose processor may be a microprocessor, or any processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving a first image frame and a corresponding set of infrared measurement values;
   dividing the first image frame into a plurality of portions based on the values included in the set of infrared measurement values, the plurality of portions including a first portion illuminated by a first light source and a second portion illuminated by a second light source, the first portion having infrared measurement values of the corresponding set of infrared measurement values that are below a first threshold, and the second portion having infrared measurement values of the corresponding set of infrared measurement values that are above the first threshold; and
   based on the division, processing the first image frame as a unit by applying a first white balancing to the first portion and applying a second white balancing to the second portion.

2. The method of claim 1, wherein:
   the dividing comprises:
   determining an indoor region as the first portion of the first image frame; and
   determining an outdoor region as the second portion of the first image frame;
   the applying of the first white balancing to the first portion comprises applying a lower correlated color temperature (CCT) to the indoor region; and
   the applying of the second white balancing to the second portion comprises applying a higher correlated color temperature (CCT) to the outdoor region.

3. The method of claim 1, wherein:
   pixels in the first portion have color values within a first threshold distance; and
   pixels in the second portion have color values within a second threshold distance.

4. The method of claim 1, wherein:
   applying the first white balancing comprises applying the first white balancing based on image content of the first portion; and
   applying the second white balancing comprises applying the second white balancing based on image content of the first portion.

5. The method of claim 1, wherein the dividing comprises:
   performing a computer vision analysis of the first image frame to identify a plurality of features in the first image frame;
   identifying a first set of pixels of the first image frame as the first portion of the first image frame based on identifying a first contiguous set of the corresponding set of infrared measurement values that are below the first threshold and a first set of the plurality of features corresponding to the first contiguous set; and identifying a second set of pixels of the first image frame as the second portion of the first image frame based on identifying a second contiguous set of the corresponding set of infrared measurement values that are above the first threshold and a second set of the plurality of features corresponding to the second contiguous set.

6. The method of claim 1, wherein the processing comprises:
   determining white balancing weights for the first image frame based on the set of infrared measurement values; and
   applying the respective white balancing based on the white balancing weights.

7. The method of claim 1, wherein receiving the corresponding set of infrared measurement values comprises:
   receiving a set of light detection and ranging (LiDAR) measurements from a LiDAR sensor; or
   receiving a set of time of flight (ToF) measurements from a time-of-flight sensor.

8. A device, comprising:
   a processor; and
   a memory coupled to the processor and storing instructions that, when executed by the processor, cause the device to perform operations comprising:
   receiving a first image frame and a corresponding set of infrared measurement values;
   dividing the first image frame into a plurality of portions based on the values included in the set of infrared measurement values, the plurality of portions including a first portion illuminated by a first light source and a second portion illuminated by a second light source, the first portion having infrared measurement values of the corresponding set of infrared measurement values that are below a first threshold, and the second portion having infrared measurement values of the corresponding set of infrared measurement values that are above the first threshold; and based on the division, processing the first image frame by applying a first white balancing to the first portion and applying a second white balancing to the second portion.

9. The device of claim 8, wherein:
the dividing comprises:
  determining an indoor region as the first portion of the first image frame; and
  determining an outdoor region as the second portion of the first image frame;
the applying of the first white balancing to the first portion comprises applying a lower correlated color temperature (CCT) to the indoor region; and
the applying of the second white balancing to the second portion comprises applying a higher correlated color temperature (CCT) to the outdoor region.

10. The device of claim 8, wherein:
pixels in the first portion have color values within a first threshold distance; and
pixels in the second portion have color values within a second threshold distance.

11. The device of claim 8, wherein:
applying the first white balancing comprises applying the first white balancing based on image content of the first portion; and
applying the second white balancing comprises applying the second white balancing based on image content of the first portion.

12. The device of claim 8, wherein dividing comprises:
performing a computer vision analysis of the first image frame to identify a plurality of features in the first image frame;
identifying a first set of pixels of the first image frame as the first portion of the first image frame based on identifying a first contiguous set of the corresponding set of infrared measurement values that are below the first threshold and a first set of the plurality of features corresponding to the first contiguous set; and identifying a second set of pixels of the first image frame as the second portion of the first image frame based on identifying a second contiguous set of the corresponding set of infrared measurement values that are above the first threshold and a second set of the plurality of features corresponding to the second contiguous set.

13. The device of claim 8, wherein the processing the first image frame comprises:
determining white balancing weights for the first image frame based on the set of infrared measurement values; and
applying the respective white balancing based on the white balancing weights.

14. The device of claim 8, wherein receiving the corresponding set of infrared measurement values comprises:
receiving a set of light detection and ranging (LiDAR) measurements from a LiDAR sensor; or
receiving a set of time of flight (ToF) measurements from a time-of-flight sensor.

15. The device of claim 8, wherein at least two of the plurality of portions have a different number of pixels as each other.

16. A non-transitory computer-readable medium storing instructions that, when executed by a processor of a device, cause the device to perform operations comprising:

receiving a first image frame and a corresponding set of infrared measurement values;

dividing the first image frame into a plurality of portions based on the values included in the set of infrared measurement values, the plurality of portions including a first portion illuminated by a first light source and a second portion illuminated by a second light source, the first portion having infrared measurement values of the corresponding set of infrared measurement values that are below a first threshold, and the second portion having infrared measurement values of the corresponding set of infrared measurement values that are above the first threshold; and based on the division, processing the first image frame as a unit by applying a first white balancing to the first portion and applying a second white balancing to the second portion.

17. The non-transitory computer-readable medium of claim 16, wherein:
the dividing comprises:
  determining an indoor region as the first portion of the first image frame; and
  determining an outdoor region as the second portion of the first image frame;
the applying of the first white balancing to the first portion comprises applying a lower correlated color temperature (CCT) to the indoor region; and
the applying of the second white balancing to the second portion comprises applying a higher correlated color temperature (CCT) to the outdoor region.

18. The non-transitory computer-readable medium of claim 16, wherein:
pixels in the first portion have color values within a first threshold distance; and
pixels in the second portion have color values within a second threshold distance.

19. The non-transitory computer-readable medium of claim 16, wherein:
applying the first white balancing comprises applying the first white balancing based on image content of the first portion; and
applying the second white balancing comprises applying the second white balancing based on image content of the first portion.

20. The non-transitory computer-readable medium of claim 16, wherein dividing comprises:
performing a computer vision analysis of the first image frame to identify a plurality of features in the first image frame;
identifying a first set of pixels of the first image frame as the first portion of the first image frame based on identifying a first contiguous set of the corresponding set of infrared measurement values that are below the first threshold and a first set of the plurality of features corresponding to the first contiguous set; and identifying a second set of pixels of the first image frame as the second portion of the first image frame based on identifying a second contiguous set of the corresponding set of infrared measurement values that are above the first threshold and a second set of the plurality of features corresponding to the second contiguous set.

21. The non-transitory computer-readable medium of claim 16, wherein the processing the first image frame comprises:
determining white balancing weights for the first image frame based on the set of infrared measurement values; and applying the respective white balancing based on the white balancing weights.

22. The non-transitory computer-readable medium of claim 16, wherein receiving the corresponding set of infrared measurement values comprises:
receiving a set of light detection and ranging (LiDAR) measurements from a LiDAR sensor; or
receiving a set of time of flight (ToF) measurements from a time-of-flight sensor.

23. A device, comprising:
a first image sensor;
a first multi-point infrared (IR) detector;
a processor coupled to the first image sensor and to the first multi-point IR detector; and
a memory coupled to the processor,
wherein the processor is configured to perform steps comprising:
receiving a first image frame from the first image sensor and a corresponding set of infrared measurement values from the first multi-point IR detector;
dividing the first image frame into a plurality of portions based on the values included in the set of infrared measurement values, the plurality of portions including a first portion illuminated by a first light source and a second portion illuminated by a second light source, the first portion having infrared measurement values of the corresponding set of infrared measurement values that are below a first threshold, and the second portion having infrared measurement values of the corresponding set of infrared measurement values that are above the first threshold; and
based on the division, processing the first image frame as a unit by applying a first white balancing to the first portion and applying a second white balancing to the second portion.

24. The device of claim 23, wherein:
the dividing comprises:
determining an indoor region as the first portion of the first image frame; and
determining an outdoor region as the second portion of the first image frame;
the applying of the first white balancing to the first portion comprises applying a lower correlated color temperature (CCT) to the indoor region; and
the applying of the second white balancing to the second portion comprises applying a higher correlated color temperature (CCT) to the outdoor region.

25. The device of claim 23, wherein:
pixels in the first portion have color values within a first threshold distance; and
pixels in the second portion have color values within a second threshold distance.

26. The device of claim 23, wherein:
applying the first white balancing comprises applying the first white balancing based on image content of the first portion; and
applying the second white balancing comprises applying the second white balancing based on image content of the first portion.

27. The device of claim 23, wherein dividing comprises:
performing a computer vision analysis of the first image frame to identify a plurality of features in the first image frame;
identifying a first set of pixels of the first image frame as the first portion of the first image frame based on identifying a first contiguous set of the corresponding set of infrared measurement values that are below the first threshold and a first set of the plurality of features corresponding to the first contiguous set; and identifying a second set of pixels of the first image frame as the second portion of the first image frame based on identifying a second contiguous set of the corresponding set of infrared measurement values that are above the first threshold and a second set of the plurality of features corresponding to the second contiguous set.

28. The device of claim 23, wherein the multi-point IR detector comprises a time of flight (ToF) measurement device, wherein receiving the corresponding set of infrared measurement values comprises receiving a set of ToF measurements from the time-of-flight measurement device.

29. The device of claim 23, wherein the multi-point IR detector comprises a light detection and ranging (LiDAR) device, wherein receiving the corresponding set of infrared measurement values comprises receiving a set of light detection and ranging (LiDAR) measurements from the LiDAR device.

* * * * *